(12) United States Patent
Shepherd et al.

(10) Patent No.: US 12,517,580 B2
(45) Date of Patent: Jan. 6, 2026

(54) AUTOMATICALLY GENERATING LANGUAGE MODEL PROMPTS USING PREDICTED REGIONS OF INTEREST

(71) Applicant: Dell Products L.P., Round Rock, TX (US)

(72) Inventors: Michael David Shepherd, Leander, TX (US); Jonathan M. Whitson, Mountain Grove, MO (US); Satheeshkumar Ramasamy, Herndon, VA (US); Joseph Tansey, Tampa, FL (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/653,056

(22) Filed: May 2, 2024

(65) Prior Publication Data
US 2025/0341889 A1    Nov. 6, 2025

(51) Int. Cl.
*G06F 3/01*      (2006.01)
*G06F 40/40*     (2020.01)
(Continued)

(52) U.S. Cl.
CPC .............. *G06F 3/013* (2013.01); *G06F 40/40* (2020.01); *G06T 19/00* (2013.01); *G06V 30/18* (2022.01)

(58) Field of Classification Search
CPC ........ G06F 3/013; G06F 40/40; G06V 30/18; G06T 19/00
See application file for complete search history.

(56) References Cited

U.S. PATENT DOCUMENTS

| 2012/0203640 A1* | 8/2012 | Karmarkar | G06F 1/1694 705/14.66 |
| 2015/0046496 A1* | 2/2015 | Karmarkar | G06F 3/013 707/798 |

(Continued)

FOREIGN PATENT DOCUMENTS

| CN | 112507799 B | * | 11/2023 | ............. G06F 3/013 |
| JP | 2020061187 A | * | 4/2020 | ......... G02B 27/0093 |
| WO | WO-2023187730 A1 | * | 10/2023 | |

OTHER PUBLICATIONS https://rasa.com/solutions/bots-digital-assistants/; downloaded Apr. 30, 2024.
(Continued)

*Primary Examiner* — Ricardo Osorio
(74) *Attorney, Agent, or Firm* — Ryan, Mason & Lewis, LLP

(57) ABSTRACT

Techniques are provided for automatically generating language model prompts using predicted regions of interest. One method comprises obtaining a focus of a user interacting with an image and/or a virtual environment; determining a predicted region of interest of the user based on the focus, wherein the predicted region of interest has associated metadata indicating an item of interest, in the image and/or the virtual environment, to the user; providing a query to an information retrieval system that generates query results, wherein the query is based on the item of interest to the user obtained from the metadata; determining a prompt for a language model based on the query results; and providing a message, automatically generated by the language model based on the prompt, to the user. The predicted region of interest of the user may be obtained by tracking a movement of an eye of the user.

20 Claims, 11 Drawing Sheets

(51) Int. Cl.
    *G06T 19/00*         (2011.01)
    *G06V 30/18*        (2022.01)

(56) References Cited

U.S. PATENT DOCUMENTS

| | | | | |
|---|---|---|---|---|
| 2015/0131794 | A1* | 5/2015 | Ellis | G06F 3/017 |
| | | | | 379/265.11 |
| 2019/0188895 | A1* | 6/2019 | Miller, IV | H04N 7/157 |
| 2021/0312684 | A1* | 10/2021 | Zimmermann | A63F 13/5255 |
| 2024/0419830 | A1* | 12/2024 | Park | G06F 21/6254 |

OTHER PUBLICATIONS

Abhinav Veeramalla, "Face Detection and Cropping Using OpenCV in Python," (Medium, Jul. 12, 2023).

Hui, Kaver Edwin; Prompt Injection of Large Language Models (LLMs) and the Corresponding Threats; https://medium.com/@hke22/prompt-injection-of-large-language-models-llms-and-the-corresponding-threats-ec75dc25027c; Jan. 17, 2024.

"Prompt Injection AI Manipulation Tactics: Understanding and Mitigation"; https://learn.snyk.io/lesson/prompt-injection/; downloaded Apr. 30, 2024.

\* cited by examiner 500-1

PROMPT:
< |IM_START|>SYSTEM
YOU ARE AN ASSISTANT THAT HELPS CUSTOMERS OF COMPANY A SOLVE COMPUTER ISSUES. THE USER IS CURRENTLY FOCUSING ON A MODEL 123 GAMING LAPTOP. THE RAG-BASED INFORMATION RETRIEVAL SYSTEM PROVIDED THE CURRENT SPECIFICATIONS FOR MODEL 123 AS A SYSTEM PROMPT:

TECH SPECS
PROCESSOR
12TH GEN COMPANY B PROCESSOR CORE (24 MB CACHE, 14 CORES, 20 THREADS, UP TO 4.70 GHZ TURBO)

OPERATING SYSTEM
(COMPANY C OPERATING SYSTEM PRO FOR BUSINESS)

GRAPHICS CARD
COMPANY D, 8 GB GDDR6

DISPLAY
15.6", QHD 2560X1440, 240HZ, NON-TOUCH, 2MS

MEMORY
16 GB, LPDDR5, 5200 MHZ, INTEGRATED, DUAL-CHANNEL

HARD DRIVE
512 GB, PCIE NVME, SSD

TOUCHPAD
MULTI-TOUCH GESTURE PREMIUM PRECISION GLASS TOUCHPAD WITH INTEGRATED SCROLLING

WIRELESS
WI-FI 6 AX1675 802.11AX 2X2 WIRELESS LAN AND BLUETOOTH 5.2

PRIMARY BATTERY
6 CELL, 87 WH, LITHIUM ION
...

ANSWER IN THE FOLLOWING FORMAT: {SPEAK: WHERE THIS FIELD WOULD BE A CONVERSATIONAL RESPONSE}, {LIST STEPS: WHERE THIS WOULD BE A LIST OF TROUBLESHOOTING STEPS}
< [IM_END| >
< |IM_START|> CUSTOMER SUPPORT:
IT APPEARS THAT YOU ARE INTERESTED IN A GAMING LAPTOP FROM COMPANY A
< IM_END| >
< |IM_START|>
CUSTOMER: YES, PLEASE. WHAT ARE THE SPECIFICATIONS?
<IM_END| >
< |IM_START|> CUSTOMER SUPPORT:
: - PROCESSOR: 12TH GEN COMPANY B PROCESSOR CORE
- DISPLAY: 15.6", QHD 2560X1440, 240HZ, NON-TOUCH, 2MS NVIDIA G-SYNC
- MEMORY: 16 GB, LPDDR5, 5200 MHZ, INTEGRATED, DUAL-CHANNEL
- CASE: LUNAR LIGHT WITH HIGH ENDURANCE CLEAR COAT DESIGNED FOR STAIN RESISTANCE
IS THERE ANYTHING ELSE I CAN ASSIST YOU WITH?
<IM_END| >

AUTOMATICALLY GENERATING LANGUAGE MODEL PROMPTS USING PREDICTED REGIONS OF INTEREST

BACKGROUND

A digital human is a computer-generated representation of a person that aims to behave like a real person. Users increasingly engage with digital humans in various environments, such as retail environments, training environments and customer support environments, and for various purposes. There are a number of challenges, however, that need to be addressed in order for such digital humans to successfully interact like a real person.

SUMMARY

Illustrative embodiments of the disclosure provide techniques for automatically generating language model prompts using predicted regions of interest. One method includes obtaining information characterizing a visual focus of at least one user interacting with one or more of at least one image and a virtual environment; determining a predicted region of interest of the at least one user based at least in part on the visual focus, wherein the predicted region of interest of the at least one user has associated metadata indicating one or more items of interest, in the one or more of the at least one image and the virtual environment, to the at least one user; providing a query to an information retrieval system that generates one or more query results, wherein the query is based at least in part on at least one of the one or more items of interest to the at least one user obtained from the metadata; determining a prompt for a language model based at least in part on at least one of the one or more query results; and providing a message, automatically generated by the language model based at least in part on the prompt, to the at least one user.

Illustrative embodiments can provide significant advantages relative to conventional techniques. For example, technical problems related to such conventional techniques are mitigated in one or more embodiments by automatically generating prompts for a language model using predicted regions of interest.

These and other illustrative embodiments described herein include, without limitation, methods, apparatus, systems, and computer program products comprising processor-readable storage media.

BRIEF DESCRIPTION OF THE DRAWINGS

FIGS. 5A and 5B, collectively, illustrate an exemplary prompt for a language model in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for automatically generating language model prompts using predicted regions of interest.

In one or more embodiments, techniques are provided for automatically generating language model prompts using predicted regions of interest. Sensing data (such as audio and/or video sensor data) related to one or more remote users can be applied to the disclosed digital human adaptation system (comprising, for example, one or more analytics algorithms, such as machine learning (ML) algorithms, artificial intelligence (AI) techniques, computer vision (CV) algorithms and/or data analytics algorithms) to obtain real-time responses for each remote user.

In at least some embodiments, the disclosed digital human adaptation techniques provide a number of technical solutions. For example, a region of interest of a particular user can be determined by applying sensing data (such as audio and/or video sensor data) related to the particular user to an analytics engine, and a predicted region of interest can be automatically provided to a language model to improve an effectiveness of the digital human experience, for example, when a user fails to speak within a designated time period or otherwise deviates from one or more specified criteria.

In one or more embodiments, the disclosed techniques for automatically generating language model prompts using predicted regions of interest employ computer vision techniques to collect and evaluate real-time user behavior information, such as eye movement. The collected data can be processed to obtain a predicted region of interest of one or more users and to initiate an automatic generation of a language model prompt to obtain a response to be delivered by a digital human based on the predicted region of interest.

At least some aspects of the disclosure recognize that users may be less engaged with a digital human than with a real person because physical interactions with the digital human may be reduced or non-existent, which may decrease the rich communication and other dynamics that encourage users to consistently participate in a dialogue. In an inperson physical environment, for example, participants can more easily identify visual cues of a user by evaluating the body language and/or facial expression of participants to obtain an immediate assessment of each participant's interests. In a remote digital human environment, however, it is difficult for participants to evaluate and assess the interests of other participants remotely.

Figure 1:
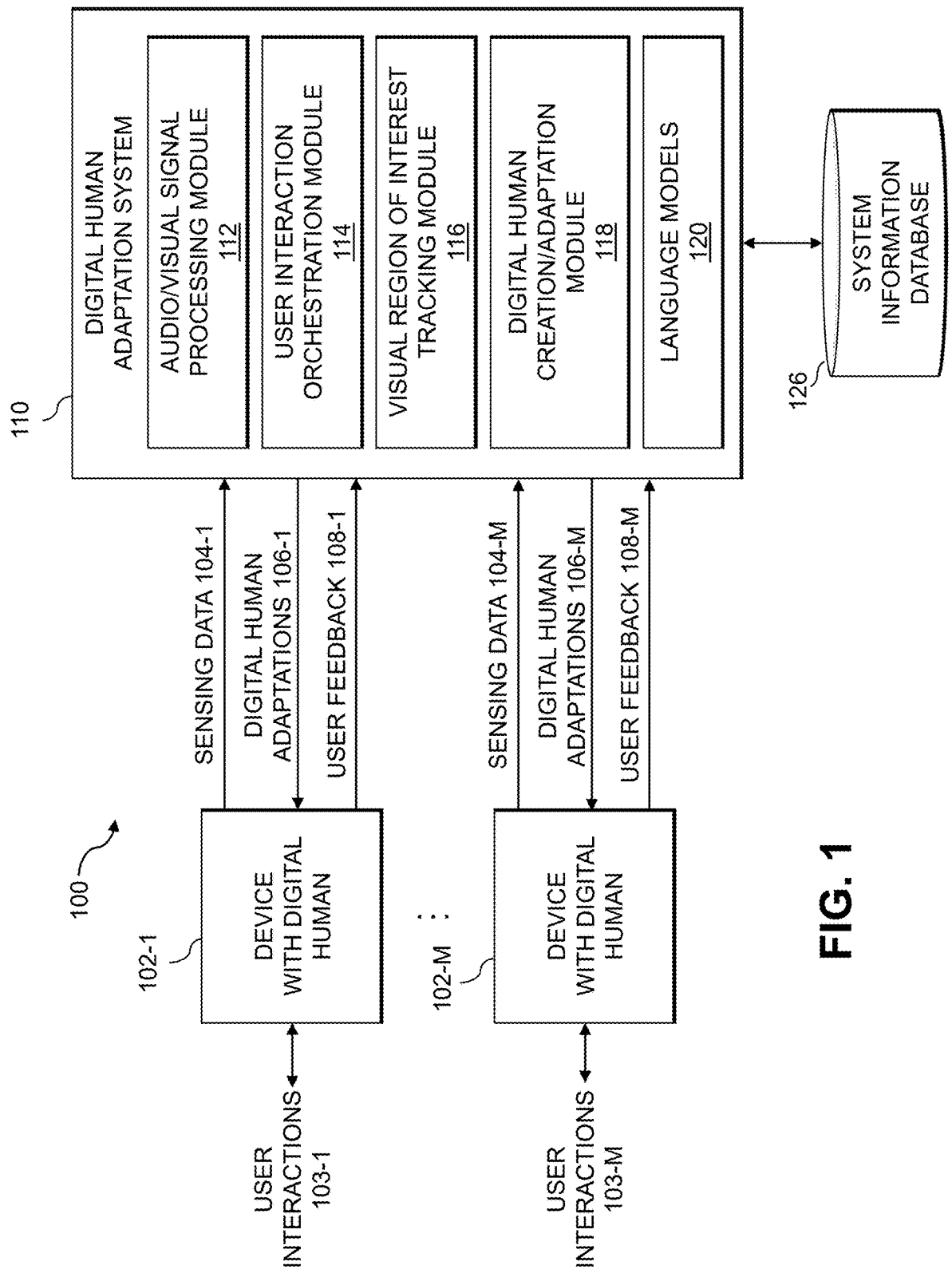
FIG. 1 illustrates an information processing system configured for automatically generating language model prompts using predicted regions of interest in accordance with an illustrative embodiment.

FIG. 1 shows an information processing system 100 configured in accordance with an illustrative embodiment. The information processing system 100 comprises a plurality of devices with a digital human 102-1 through 102-M, collectively referred to herein as digital human devices 102. The digital human devices 102-1 through 102-M interact with one or more respective users to generate respective user interactions 103-1 through 103-M. Generally, artificial intelligence-based chat robots (e.g., chatbots) or other digital humans typically use one or more machine learning models to understand a context and an intent of a question asked by a user before providing an answer. The digital human devices 102 may be implemented, for example, as a user device presenting a digital human, a kiosk presenting a digital human, and/or a device that presents a digital human using a holograph and/or a three-dimensional or lenticular display. The information processing system 100 further comprises one or more digital human adaptation systems 110 and a system information database 126, discussed below.

The digital human devices 102 may comprise, for example, host devices and/or devices such as mobile telephones, laptop computers, tablet computers, desktop computers, kiosks, holographic devices, three-dimensional displays or other types of computing devices (e.g., virtual reality (VR) devices or augmented reality (AR) devices). Such devices are examples of what are more generally referred to herein as "processing devices." Some of these processing devices are also generally referred to herein as "computers." The digital human devices 102 may comprise a network client that includes networking capabilities such as ethernet, Wi-Fi, etc. The digital human devices 102 may be implemented, for example, by participants of a customer support interaction, such as one or more users or customers and one or more virtual customer support representatives.

One or more of the digital human devices 102 and the digital human adaptation system 110 may be coupled to a network, where the network in this embodiment is assumed to represent a sub-network or other related portion of a larger computer network. The network is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network in some embodiments therefore comprises combinations of multiple different types of networks, each comprising processing devices configured to communicate using internet protocol (IP) or other related communication protocols.

The digital human devices 102 and/or the digital human adaptation system 110 in some embodiments comprise respective devices and/or servers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, such as avatar or other computer-generated representations of a human, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of edge devices, or a stand-alone computing and storage system implemented within a given enterprise.

One or more of the digital human devices 102 and the digital human adaptation system 110 illustratively comprise processing devices of one or more processing platforms. For example, the digital human adaptation system 110 can comprise one or more processing devices each having a processor and a memory, possibly implementing virtual machines and/or containers, although numerous other configurations are possible. The processor illustratively comprises a microprocessor, a microcontroller, an application-specific integrated circuit (ASIC), a field-programmable gate array (FPGA) or other type of processing circuitry, as well as portions or combinations of such circuitry elements.

One or more of the digital human devices 102 and the digital human adaptation system 110 can additionally or alternatively be part of cloud infrastructure or another cloud-based system.

In the example of FIG. 1, each digital human device 102-1 through 102-M provides corresponding sensing data 104-1 through 104-M, collectively referred to herein as sensing data 104, associated with the respective user to the digital human adaptation system 110. For example, the sensing data 104 may be generated by cameras, microphones, IoT sensors or other sensors near the respective users that can be used for data collection, including audio signals, video signals, physiological data, motion and emotion data. The sensors may be embedded within existing digital human devices 102, such as graspable and touchable user devices (e.g., computer, monitor, mouse, keyboards, smart phone and/or AR/VR headsets). The sensors may also be implemented as part of laptop computer devices, smart mobile devices or wearable devices on the body of a user, such as cameras, microphones, physiological sensors and smart watches.

In addition, each digital human device 102-1 through 102-M can receive digital human adaptations 106-1 through 106-M, collectively referred to herein as digital human adaptations 106, from the digital human adaptation system 110. The digital human adaptations 106 can be initiated, for example, to present and/or adjust a digital human on the respective digital human device 102, or to provide specific information to a respective user (e.g., requested information and/or topic summaries) and/or to stimulate the respective user if the respective user is detected to have a different sentiment or level of engagement than expected.

Further, each digital human device 102 can provide user feedback 108-1 through 108-M, collectively referred to herein as user feedback 108, to the digital human adaptation system 110 indicating, for example, an accuracy of information provided by the digital human on the digital human device 102 to a respective user (e.g., to fine tune an analytics engine or another model associated with the digital human adaptation system 110), special circumstances associated with the respective user and/or feedback regarding particular recommendations or suggestions made by the digital human adaptation system 110 in the form of digital human adaptations 106.

In some embodiments, users can receive or request information from the digital human on the digital human device 102, and provide the user feedback 108 back to the digital human adaptation system 110 indicating whether the digital human response or recommendations are accurate, thereby providing a closed loop learning system. The user feedback 108 indicating the accuracy of the digital human response or recommendations can be used to train and/or retrain one or more models employed by the digital human adaptation system 110.

In some embodiments, each digital human device 102 can receive additional feedback from the digital human adaptation system 110 based at least in part on the user interactions 103 of the respective user with the digital human. For example, the digital human adaptations 106 for a given user may comprise a text signal (e.g., to be transformed into a voice signal by the digital human), a voice message, graphical information and/or manipulations of the position, emotion and/or rotation of the digital human, or a combination of the foregoing, to provide targeted information, an alert and/or instructions to the given user during a digital human session.

The digital human adaptations 106 can be automatically generated, for example, if users are detected to have a negative sentiment or to be distracted (e.g., when the measured engagement level falls below a threshold or deviates from another criteria). For example, a voice message can ask if a user needs assistance during a digital human session, when the user fails to speak within a designated time period, or when the user is stressed or uninterested, for example. The digital human adaptations 106 could be specifically designed based on different scenarios.

As shown in FIG. 1, the exemplary digital human adaptation system 110 comprises an audio/visual signal processing module 112, a user interaction orchestration module 114, a visual region of interest tracking module 116, a digital human creation/adaptation module 118 and at least one language model 120, as discussed further below.

In one or more embodiments, the audio/visual signal processing module 112 may be used to collect and/or process audio/visual data and other sensing data 104 and to optionally perform one or more (i) sensor data pre-processing tasks, (ii) audio/visual analysis tasks and/or (iii) audio/visual tracking tasks, for example. The user interaction orchestration module 114 coordinates the user interactions 103 between the digital human devices 102 and the respective users with one or more backend portions of the digital human adaptation system 110, for example. The exemplary visual region of interest tracking module 116 evaluates the audio/visual data and/or other sensor data to determine a visual region of interest to a particular user. The visual region of interest determined by the visual region of interest tracking module 116 may be used to generate one or more user query-based prompts that are applied to at least one language model 120, such as a large language model or another model that can generate text and perform natural language processing (NLP) tasks, that determines a response to a user of a respective digital human device 102, as discussed further below in conjunction with FIGS. 2 through 4, for example. The at least one language model 120 may learn statistical relationships from a training dataset comprised of text documents using a self-supervised training process and/or a semi-supervised training process. The at least one language model 120, in some embodiments, may combine a partial response based on results from a user query and/or a partial response of the at least one language model 120 based on its own information into a final response.

The term "language model" as used herein is intended to be broadly construed so as to encompass, for example, natural language processing models trained on textual data to understand, generate, predict and/or summarize new content. The at least one language model 120 may be implemented, for example, using transformer-based architectures that process input through a sequence of transformers, where each transformer includes a self-attention layer and feedforward layer. Generally, a self-attention layer computes an importance of each token in a sequence of input tokens, and a feedforward layer transforms the output of the self-attention layer into a form that is suitable for the next transformer in the sequence.

The digital human creation/adaptation module 118 generates a given digital human presented on a respective digital human device 102 and/or one or more digital human adaptations 106 to one or more of the digital human devices 102, as discussed further below. The digital human creation/adaptation module 118 may be implemented, at least in part, using an Unreal Engine three-dimensional computer graphics tool, commercially available from Epic Games, Inc., as modified herein to provide the features and functions of the present disclosure.

It is to be appreciated that this particular arrangement of elements 112, 114, 116, 118, 120 illustrated in the digital human adaptation system 110 of the FIG. 1 embodiment is presented by way of example only, and alternative arrangements can be used in other embodiments. For example, the functionality associated with elements 112, 114, 116, 118, 120 in other embodiments can be combined into a single elements, or separated across a larger number of elements. As another example, multiple distinct processors and/or memory elements can be used to implement different ones of elements 112, 114, 116, 118, 120 or portions thereof. At least portions of elements 112, 114, 116, 118, 120 may be implemented at least in part in the form of software that is stored in memory and executed by a processor.

The digital human adaptation system 110 may further include one or more additional modules and other components typically found in conventional implementations of such devices, although such additional modules and other components are omitted from the figure for clarity and simplicity of illustration.

In the FIG. 1 embodiment, the digital human adaptation system 110 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of the digital human adaptation system 110 to reside in different data centers. Numerous other distributed implementations of the components of the system 100 are possible.

As noted above, the digital human adaptation system 110 can have an associated system information database 126 configured to store information related to one or more of the digital human devices 102, such as sensing, AR and/or VR capabilities, user preference information, static digital human topologies and a digital human datastore. Although the system information is stored in the example of FIG. 1 in a single system information database 126, in other embodiments, an additional or alternative instance of the system information database 126, or portions thereof, may be incorporated into the digital human adaptation system 110 or other portions of the system 100.

The system information database 126 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the digital human devices 102 and the digital human adaptation system 110 can be one or more input/output devices (not shown), which illustratively comprise keyboards, displays or other types of input/output devices in any combination. Such input/output devices can be used, for example, to support one or more user interfaces to a digital human device 102, as well as to support communication between the digital human adaptation system 110 and/or other related systems and devices not explicitly shown in FIG. 1.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for digital human adaptation is presented by way of illustrative example only, and in other embodiments additional or alternative elements may be used. Thus, another embodiment includes additional or alternative systems, devices and other network entities, as well as different arrangements of modules and other components.

One or more aspects of the disclosure recognize that existing digital humans lack an ability to predict questions of a user simply through observation. While humans can notice where a person is looking and ask them a question about the item they are looking at, a digital human needs an awareness of where the person is looking and what aspects of a display screen, for example, are being looked at.

Figure 2:
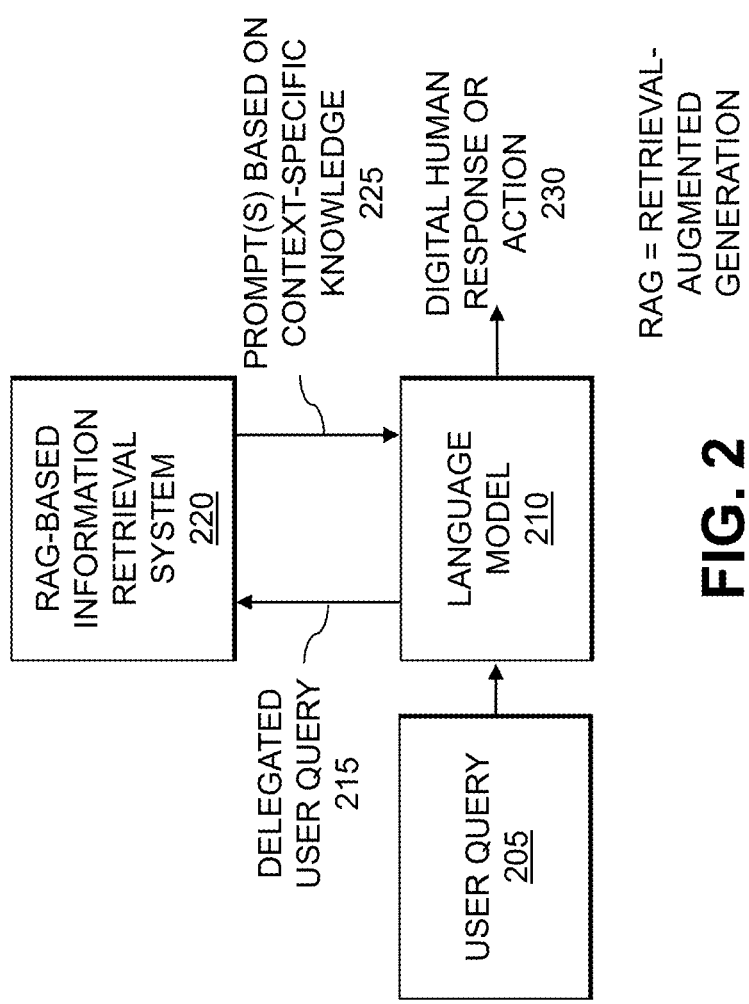
FIG. 2 illustrates a generation of a response for a digital human based at least in part on a user query-based prompt applied to a language model in accordance with an illustrative embodiment.

FIG. 2 illustrates a generation of a response for a digital human based at least in part on a user query-based prompt applied to a language model in accordance with an illustrative embodiment. In the example of FIG. 2, a user query 205 is applied to a language model 210. The user query 205 may be an explicit question asked by a user (e.g., as part of a conversational dialogue) and/or an implied question inferred from behavior of the user, such as a predicted region of interest to the user based at least in part on what the user is looking at (e.g., which may suggest what a person is thinking about and may be used to initiate and/or continue a dialogue with the user). In this manner, one or more embodiments of the present disclosure provide for intelligent prompt injection to the language model 210 using a retrieval-augmented generation (RAG)-based information retrieval system 220 to benefit the conversational flow.

The language model 210 (or another backend element of the digital human adaptation system 110) may delegate the user query 205, in some embodiments, as a delegated user query 215 to the RAG-based information retrieval system 220. The RAG-based information retrieval system 220 receives the delegated user query 215 as an input and performs one or more information retrieval operations. The response from the RAG-based information retrieval system 220 may be in the form of ranked results in some embodiments, and the top N results (e.g., the highest-ranking result) may be applied to the language model 210 as one or more prompts (e.g., based at least in part on a prompt size limit).

The RAG-based information retrieval system 220 generates one or more prompts 225 based on context-specific knowledge obtained using the delegated user query 215. RAG is a technique for enhancing the accuracy and/or reliability of generative artificial intelligence models, such as the language model 210, with information obtained from external sources. The prompts 225 ground the language model 210 in some embodiments using one or more external sources of knowledge that supplement the internal representation of information by the language model 210. The RAG-based information retrieval system 220 may be implemented, at least in part, in some embodiments, using the Pryon answer engine, commercially available from Pryon Inc. and/or the information retrieval functionality of the Milvus open-source vector database system.

The one or more prompts 225 are applied to the language model 210 that generates a digital human response or action 230 (e.g., relevant information and responses based on a conversational dialogue and/or the user's region of interest). The language model 210 may combine the retrieved words in the one or more prompts 225 with its own response to the user query 205 into a final digital human response or action 230. The digital human response or action 230 may be communicated to the user, for example, using the digital human creation/adaptation module 118, as discussed herein. The digital human response or action 230 may comprise relevant information and responses based on a conversational dialogue and/or what the user was looking at.

For additional discussions of digital human adaptation techniques, see, for example, United States patent application Ser. No. 18/652,936 entitled "Gesture-Based Processing of Digital Human Responses"; United States patent application Ser. No. 18/652,943 entitled "Orienting Digital Humans Towards Isolated Speaker," now U.S. Pat. No. 12,326,968); United States patent application Ser. No.

18/652,961 entitled "Selecting Isolated Speaker Signal by Comparing Text Obtained from Audio and Video Streams"; United States patent application Ser. No. 18/652,977 entitled "Phoneme-Based Pronunciations for Digital Humans"; United States patent application Ser. No. 18/653,017 entitled "Sentiment-Based Adaptation of Digital Human Responses"; United States patent application Ser. No. 18/652,990 entitled "Pause-Based Text-To-Speech Processing for Digital Humans"; United States patent application Ser. No. 18/652,926 entitled "Identity-Based Varied Digital Human Responses"; United States patent application Ser. No. 18/653,028 entitled "Reinstantiating Digital Humans With Stored Session Context in Response to Device Transfer"; United States patent application Ser. No. 18/653,046 entitled "Reinstantiating Digital Humans With Stored Session Context in Response to Navigation to a Different Destination"; and United States patent application Ser. No. 18/652,991 entitled "Personalizing Vehicles Using Digital Humans to Administer User Preferences", each filed contemporaneously herewith and incorporated by reference herein in its entirety.

Figure 3:
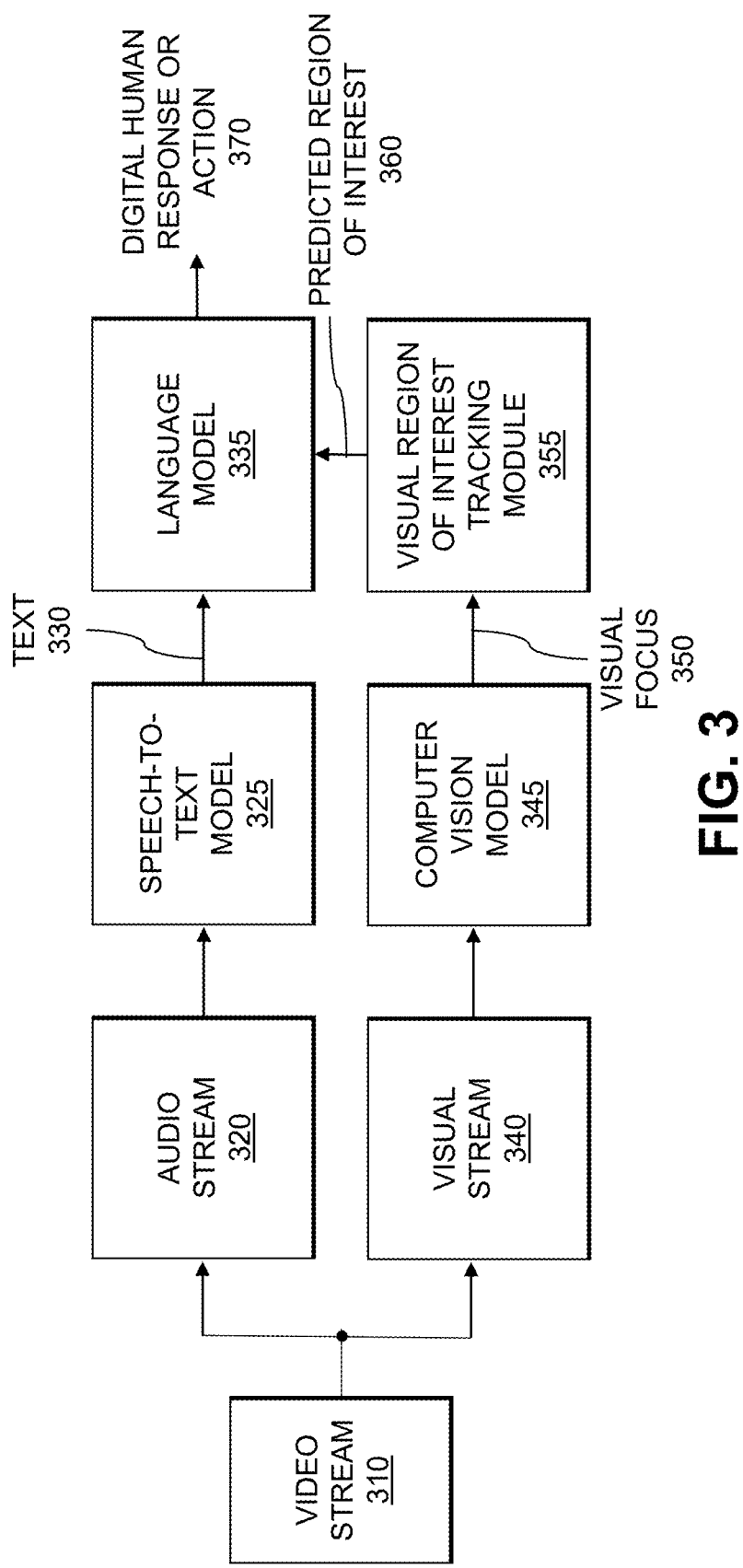
FIG. 3 illustrates an exemplary processing of a video stream associated with a user to determine a predicted region of interest of the user in accordance with an illustrative embodiment.

FIG. 3 illustrates an exemplary processing of a video stream associated with a user to determine a predicted region of interest of the user in accordance with an illustrative embodiment. In the example of FIG. 3, a received video stream 310 (e.g., as part of sensing data 104 from an environment where a digital human is interacting with a user) is separated into an audio stream 320 and a visual stream 340.

In one or more embodiments, the audio stream 320 is applied to a speech-to-text model 325 that generates text 330 that is applied to a language model 335 that operates in a similar manner as the language models 120 and 210 of FIGS. 1 and 2, respectively. One or more embodiments of the disclosure include utilizing TensorFlow, which provides a speech command dataset that can include, for example, one-second utterances of multiple words spoken by multiple people. Such a dataset can be used as training data for the speech-to-text model 325, and one or more designated libraries can be used for audio processing in Python, for example. Additionally, at least one embodiment includes using at least one neural network for feature learning and predicting conversions of audio data to text data. The speech-to-text model 325 in such an embodiment can use, for example, a one-dimension convolutional neural network, such as a Conv1d layer.

In at least one embodiment, the visual stream 340 is applied to a computer vision model 345. The computer vision model 345 in some embodiments may comprise a pre-trained computer vision model (e.g., pre-trained using reference and/or authenticated component images) such as, for example, a model based on at least one convolutional neural network. The computer vision model 345 may identify a portion of an image, for example, where the user is focusing his or her attention, as discussed further below in conjunction with FIGS. 6 and 7, using a convolutional neural network (CNN) model, such as a region-based CNN (R-CNN) model to perform visual region of interest prediction. As discussed further below, the computer vision model 345 may evaluate images of a user relative to information on a user interface or webpage and determine which portion of the user interface or webpage has the user's visual attention. The computer vision model 345 may evaluate the locations of different user interface or webpage components.

The computer vision model 345 may perform object detection and/or isolate objects of interest (such as faces, lips or other body parts) using bounding boxes and/or other cropping techniques to create rectangular image snippets, for example. The computer vision model 345 may be implemented using the techniques described in, for example, Abhinav Veeramalla, "Face Detection and Cropping using OpenCV in Python," (Medium, Jul. 12, 2023), incorporated by reference herein in its entirety. In some embodiments, the computer vision model 345 may perform a loop for each detected face (or other body parts of interest), extract the face from the image, standardize a size of the extracted portion (e.g., a cropped face or other body part) and provide the coordinates of the cropped body part (such as 200×200 rectangular pixels).

As shown in FIG. 3, the computer vision model 345 generates an area of visual focus 350, as discussed further below in conjunction with FIGS. 6 and 7, for example. The area of visual focus 350 is applied to a visual region of interest tracking module 355 that generates a predicted region of interest 360 that is applied to the language model 335. Generally, during a live user session, the visual region of interest tracking module 355 may track a user's eye movement and perform a classification activity to determine which region of interest the user is showing a high interest in. The predicted region of interest 360 may be based, at least in part, on a time-based threshold applied to the area of visual focus 350 that must be satisfied before declaring a predicted region of interest 360.

The language model 335 processes the text 330 and the predicted region of interest 360 (e.g., as metadata) to generate a digital human response or action 370 (e.g., relevant information and responses based on a conversational dialogue and/or the user's region of interest). In this manner, in instances where the user input has dwindled (for example, in response to the user input falling below a designated threshold), the predicted region of interest 360 may be used by the digital human to initiate and/or continue a conversational dialogue with the user.

Figure 4:
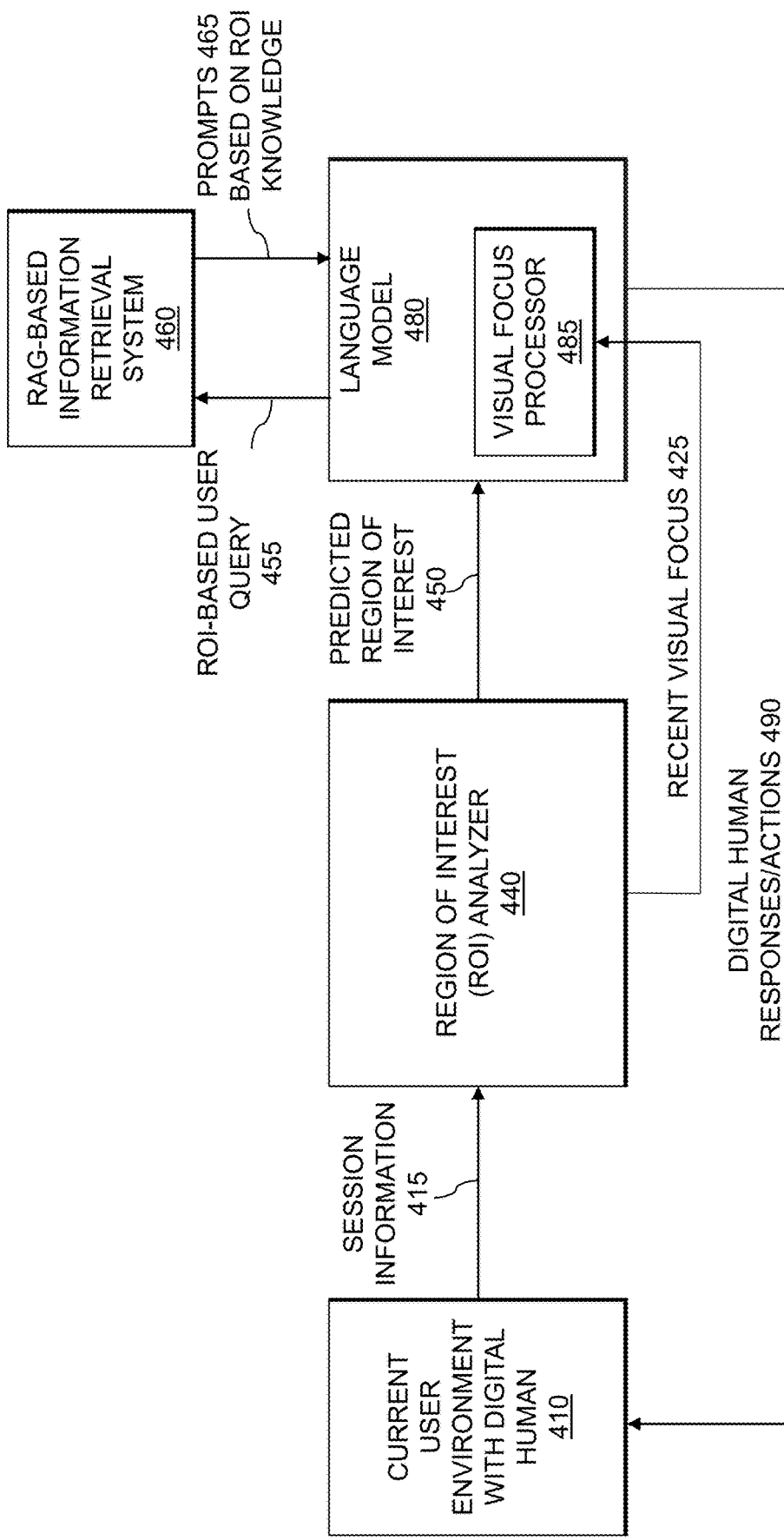
FIG. 4 illustrates an exemplary generation of a response for a digital human based at least in part on a region of interest-based prompt applied to a language model in accordance with an illustrative embodiment.

FIG. 4 illustrates an exemplary generation of a response for a digital human based at least in part on a region of interest-based prompt applied to a language model in accordance with an illustrative embodiment. In the example of FIG. 4, session information 415 (e.g., sensing data 104) from a current user environment with a digital human 410 is applied to a region of interest analyzer 440 (e.g., that employs the techniques described above in conjunction with FIG. 3). The region of interest analyzer 440 generates a predicted region of interest 450 that is applied to a language model 480 that operates in a similar manner as the language models 120 and 210 of FIGS. 1 and 2, respectively. In addition, the region of interest analyzer 440 may generate a recent visual focus signal 425 that is applied to a visual focus processor 485 of the language model 480 that may apply a time-based threshold to the recent visual focus signal 425. In at least some embodiments, the time-based threshold must be satisfied before declaring a predicted region of interest 450. In other embodiments, the visual focus processor 485 may process the recent visual focus signal 425 to determine a confidence of the predicted region of interest 450. The visual focus processor 485 may also, or alternatively, process heatmaps indicating the recent visual focus and detect when the heatmaps indicate that a given user is concentrating on a particular area (for example, by applying a time-based threshold to a given portion of a heatmap).

In one or more embodiments, the predicted region of interest 450 is used to generate a region of interest (ROI)-based user query 455 using techniques discussed further below in conjunction with FIGS. 6 and 7. The ROI-based user query 455 is applied to a RAG-based information retrieval system 460 that operates in a similar manner as the RAG-based information retrieval system 220 of FIG. 2. The RAG-based information retrieval system 460 processes the ROI-based user query 455 and generates one or more prompts 465 based on the knowledge associated with the predicted region of interest 450. As noted above, the RAG-based information retrieval system 460 may be implemented, at least in part, in some embodiments, using the Pryon answer engine, commercially available from Pryon Inc. and/or the information retrieval functionality of the Milvus open-source vector database system.

The language model 480 generates one or more digital human responses and/or actions 490 (e.g., relevant information and responses based on a conversational dialogue and/or the user's region of interest).

One or more aspects of the disclosure recognize that when a user asks about a specific product for which the language model does not have information, without the disclosed intelligent prompt injection techniques, the language model may provide a response that looks convincing but is actually incorrect (a phenomena sometimes referred to as language model hallucination). With the disclosed intelligent prompt injection techniques, the relevant information that is pertaining to the specifications of the specific product is obtained from a RAG-based information retrieval system 220, for example, and applied as a prompt to the language model, resulting in more accurate answers. In addition, when session context information is persistently stored, the user is able to ask additional questions and the language model is able to remember past information to assist in answering the additional questions.

FIGS. 5A and 5B, collectively, illustrate an exemplary system prompt 500-1 and 500-2, respectively, for a language model in accordance with an illustrative embodiment. In the example of FIG. 5A, the system prompt 500-1 tells the language model that the language model is acting as an assistant that helps customers of a given company (e.g., company A) to solve computer issues. The system prompt 500-1 also tells the language model that the user is currently focusing on a given model of a given product (e.g., a model 123 gaming laptop). The language model is also told that the RAG-based information retrieval system provided the current technical specifications for the given model as a system prompt, as shown in FIG. 5A.

In the second portion of the system prompt 500-2, shown in FIG. 5B, the language model is told to speak when the information would be a conversational response and to list one or more steps when the information is a list of troubleshooting steps. During the conversational dialogue, the language model tells the digital human to state that it appears that the user is interested in a gaming laptop from company A (e.g., based on, for example, a predicted region of interest of the user). The user then asks for the specifications of the gaming laptop from company A, which have already been provided to the language model as a system prompt 500-1 using information obtained from the RAG-based information retrieval system. The digital human provides the requested specifications to the user.

As noted above, audio/visual data and/or other sensor data from a user environment may be evaluated in some embodiments to determine a visual region of interest to a particular user. The visual region of interest may be used to generate one or more user query-based prompts that are applied to at least one language model (e.g., language model 120) or another model that can generate text and perform natural language processing tasks to determine a digital human response to a user. The visual region of interest is predicated, in some embodiments, on a predefinition of designated regions of interest, for example, on a webpage or a user interface.

For example, a user may be prompted to define a grid (or another allocation of screen space) over a given web site. In a manual implementation that generates metadata around these regions of interest, a user would define the metadata associated with each region of interest. In an automated implementation that generates metadata around these regions of interest, designated portions of the given web site would be sliced as an input of separate images that would have optical character recognition techniques applied against each designated portion of the given web site. The text extracted from a given region of interest may be sent to a language model where the text would be enriched and preprocessed to support a RAG-based activity, for example.

Figure 6:
FIG. 6 illustrates an exemplary webpage having a number of designated portions that may be of interest to a user in accordance with an illustrative embodiment.

FIG. 6 illustrates an exemplary webpage 600 (e.g., of a given retailer, such as Company E), or another mechanism for visually presenting information to a user, in accordance with an illustrative embodiment. In the example of FIG. 6, the exemplary webpage 600 has a number of designated portions 610-1 through 610-6 that may be of interest to a user. For example, designated portion 610-3 is a product advertisement for a laptop model XYY from company A having a 15.6" display and 16 GB of memory, as well as a 512 GB SSD storage device and a color of silver. In addition, the product advertisement associated with designated portion 610-3 has a promotional price of $999.99 associated with a cyber-Monday deal. The dashed circle 620 indicates that the designated portion 610-3 is the current region of interest for a particular user (determined, for example, using the computer vision techniques described above).

The current region of interest for the particular user may be used to generate a user query (such as ROI-based user query 455) that is applied to an information retrieval system (such as RAG-based information retrieval system 460) to obtain one or more prompts 465 based on the knowledge associated with the predicted region of interest 450, as discussed above in conjunction with FIG. 4.

In another example, a user may have initiated a conversation with a digital human in a shopping scenario, for example, at a retail location. If the conversation stalls, and the computer-vision model determines that the user is spending a significant amount of time looking at a particular product in the retail location (that has been mapped to a designed region of interest, for example), the digital human may use the region of interest information as an input to an information retrieval system to obtain a prompt (e.g., based on the search results from the information retrieval system), such as "a person is currently shopping sales deals at the retail location and appears to be interested in the particular product (e.g., a laptop XYZ). Strike up a conversation with the person to see if they have any questions about laptop XYZ and let the person know that you can provide them with any needed information with respect to laptop XYZ. Be polite and not pushy but let them know as a digital assistant, you can help them."

Figure 7:
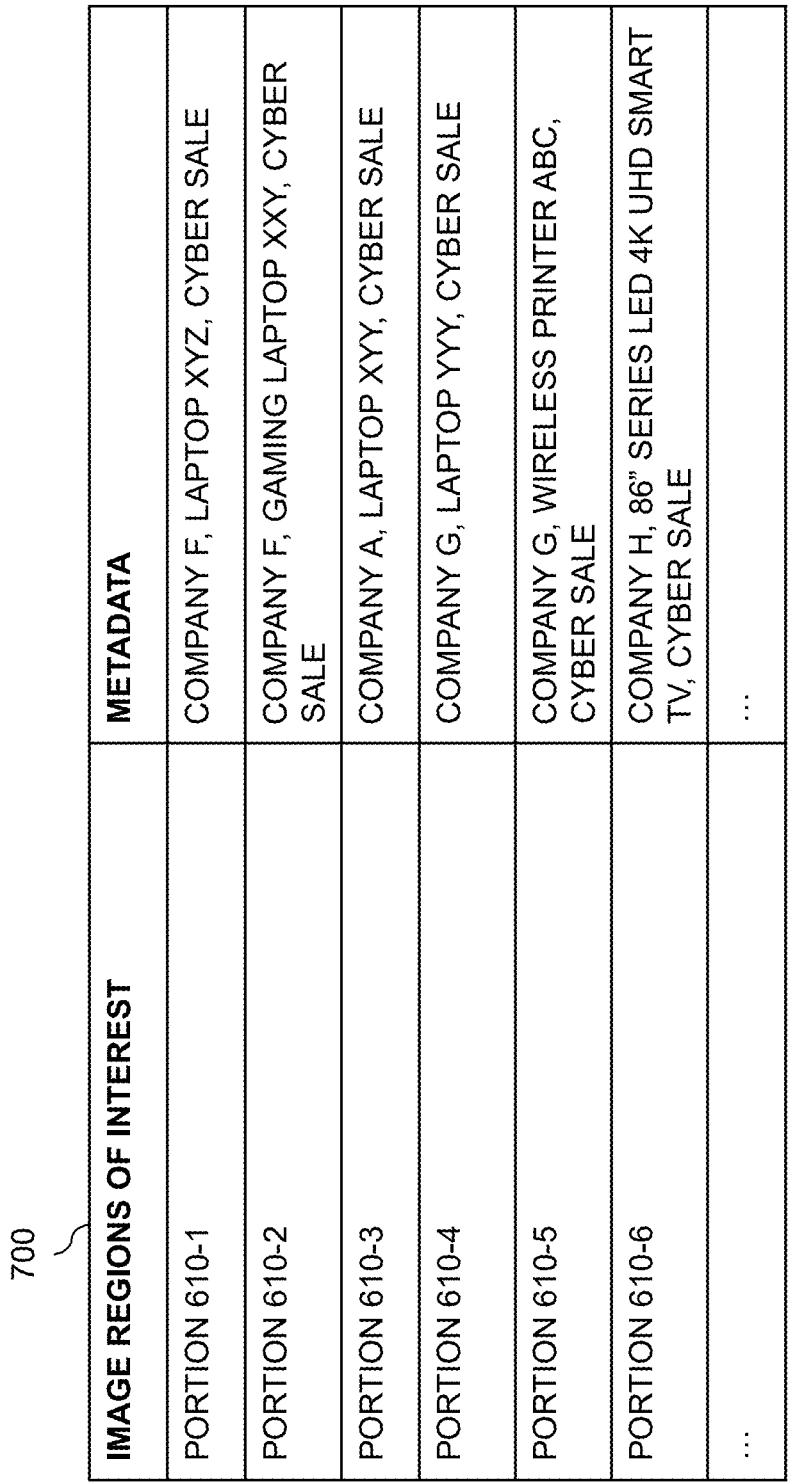
FIG. 7 is a sample table illustrating metadata for the designated portions of FIG. 6 that may be of interest to a user in accordance with an illustrative embodiment.

FIG. 7 is a sample table 700 illustrating metadata for the designated portions 610 of FIG. 6 that may be of interest to a user in accordance with an illustrative embodiment. In the example of FIG. 7, each designated portion 610 of FIG. 6, such as designated portions 610-1 through 610-6, the corresponding metadata may identify the corresponding product that is associated with the respective portion, and optionally any deals or sales associated with the associated product. The metadata associated with each designated portion may be provided as context in an ROI-based user query. In some embodiments, the x, y coordinates of a given portion of a webpage determined to be a predicted region of interest may be translated to metadata using the sample table 700 of FIG. 7. Similarly, metadata can be obtained for designated portions (e.g., three-dimensional portions) of a virtual environment, in a similar manner as the webpage example of FIGS. 6 and 7, and the x, y, z coordinates of a given portion of a virtual environment determined to be a predicted region of interest may be translated to metadata using a table similar to the sample table 700 of FIG. 7, as would be apparent to a person of ordinary skill in the art.

Figure 8:
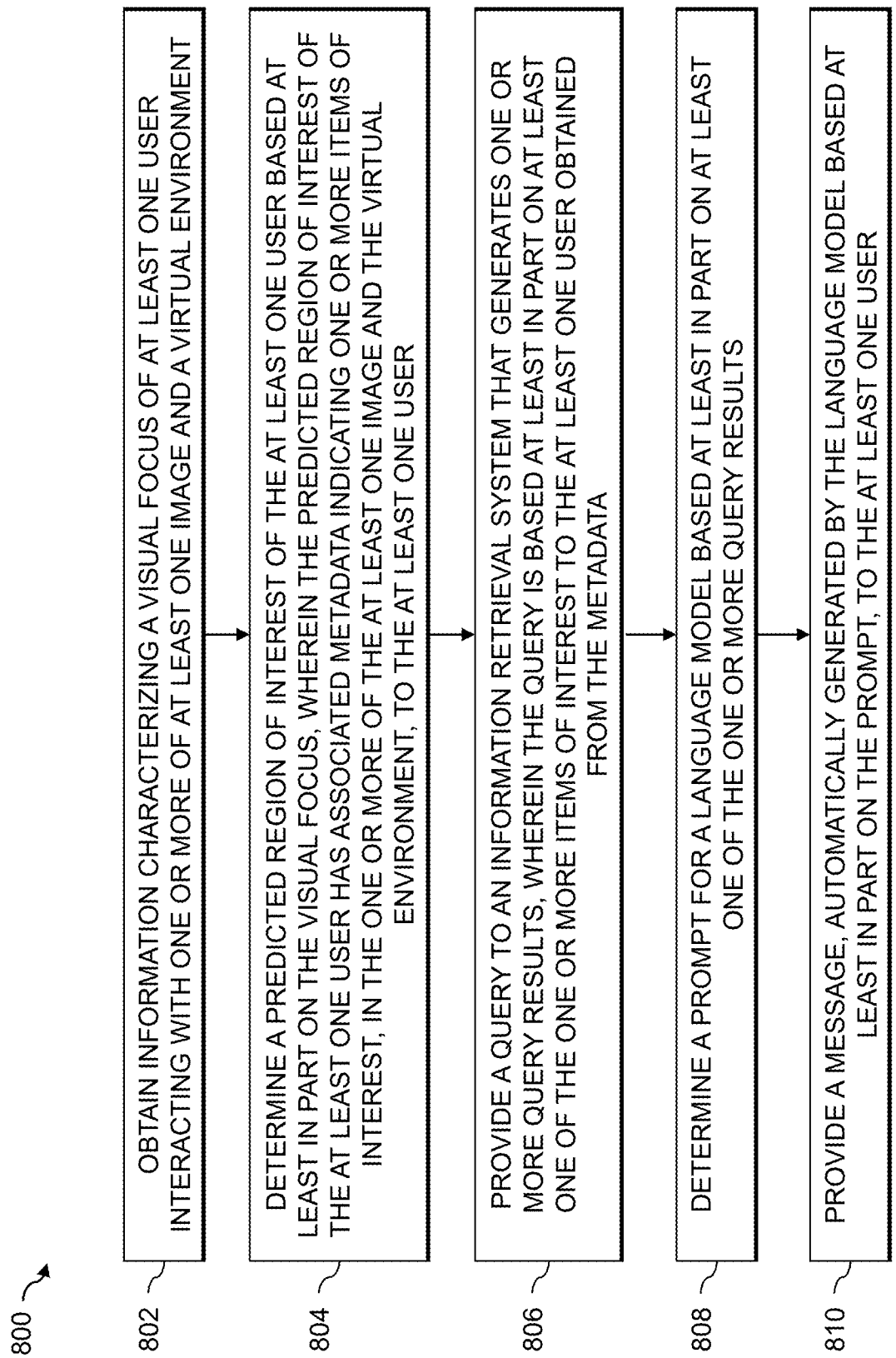
FIG. 8 is a flow diagram illustrating an exemplary implementation of a process for automatically generating language model prompts using predicted regions of interest in accordance with an illustrative embodiment.

FIG. 8 is a flow diagram illustrating an exemplary implementation of a process 800 for automatically generating language model prompts using predicted regions of interest in accordance with an illustrative embodiment. In the example of FIG. 8, information is obtained in step 802 characterizing a visual focus of at least one user interacting with one or more of at least one image and a virtual environment.

In step 804, a predicted region of interest of the at least one user is determined based at least in part on the visual focus, wherein the predicted region of interest of the at least one user has associated metadata indicating one or more items of interest, in the one or more of the at least one image and the virtual environment, to the at least one user. A query is provided in step 806 to an information retrieval system that generates one or more query results, wherein the query is based at least in part on at least one of the one or more items of interest to the at least one user obtained from the metadata. A prompt is determined in step 808 for a language model based at least in part on at least one of the one or more query results. A message, automatically generated by the language model based at least in part on the prompt, is provided to the at least one user in step 810.

In at least one embodiment, the metadata indicating the one or more items of interest to the at least one user is one or more of provided by a given user and generated by extracting one or more characters from one or more images. The metadata indicating the one or more items of interest to the at least one user may be associated with a corresponding portion, of a plurality of portions, of the one or more of the at least one image and the virtual environment.

In some embodiments, a movement of at least one eye of the at least one user may be tracked and the predicted region of interest of the at least one user may be predicted based at least in part on the tracked eye movement. A movement of at least one eye of the at least one user may be tracked and one or more heatmaps may be generated to determine the predicted region of interest of the at least one user.

In one or more embodiments, a context of a conversation with the at least one user may be stored and a response to one or more questions of the user may be generated using the stored context. The message may be provided to the at least one user using at least one processor-based digital human.

The particular processing operations and other network functionality described in conjunction with FIGS. 2, 3, 4, 5A, 5B, and 8, for example, are presented by way of illustrative example only, and should not be construed as limiting the scope of the disclosure in any way. Alternative embodiments can use other types of processing operations for automatically generating language model prompts using predicted regions of interest. For example, the ordering of the process steps may be varied in other embodiments, or certain steps may be performed concurrently with one another rather than serially. In one aspect, the process can skip one or more of the steps. In other aspects, one or more of the steps are performed simultaneously. In some aspects, additional steps can be performed.

One or more embodiments of the disclosure provide improved methods, apparatus and computer program products for automatically generating language model prompts using predicted regions of interest. The foregoing applications and associated embodiments should be considered as illustrative only, and numerous other embodiments can be configured using the techniques disclosed herein, in a wide variety of different applications.

It should also be understood that the disclosed techniques for automatically generating language model prompts using predicted regions of interest, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for automatically generating language model prompts using predicted regions of interest may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a PaaS, IaaS, STaaS and/or FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based digital human adaptation engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based digital human adaptation platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
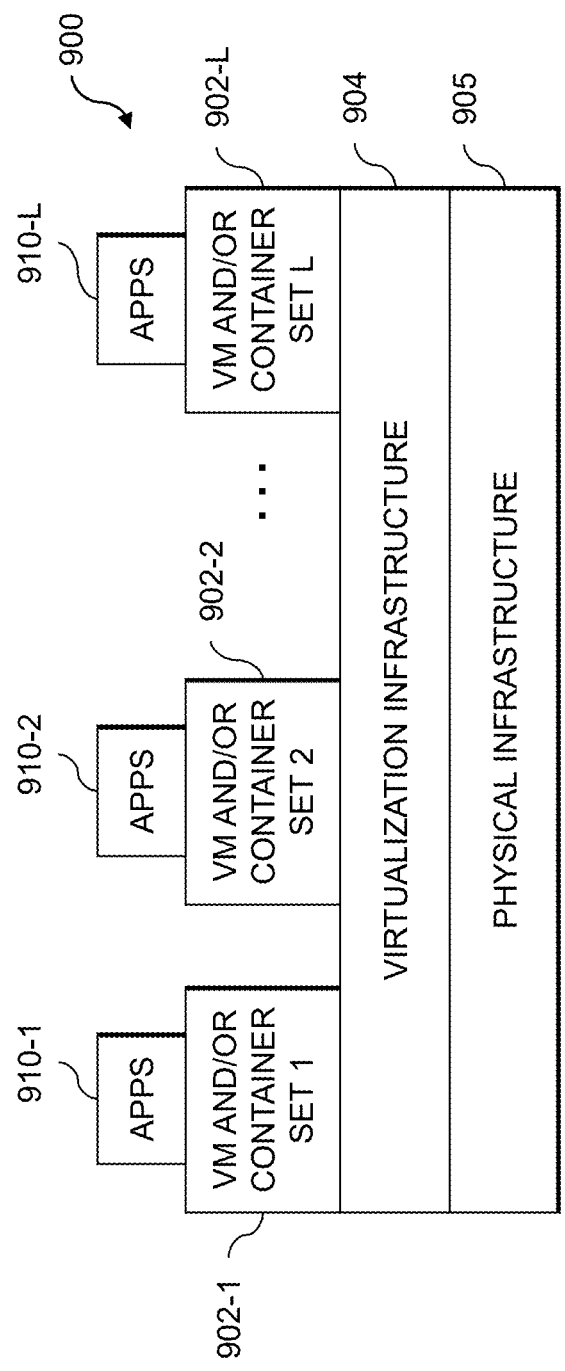
FIG. 9 illustrates an exemplary processing platform that may be used to implement at least a portion of one or more embodiments of the disclosure comprising a cloud infrastructure.

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide digital human adaptation functionality of the type described above for one or more processes running on a given one of the VMs. For example, each of the VMs can implement digital human adaptation control logic and associated functionality for monitoring users interacting with a digital human, for one or more processes running on that particular VM.

An example of a hypervisor platform that may be used to implement a hypervisor within the virtualization infrastructure 904 is a compute virtualization platform which may have an associated virtual infrastructure management system such as server management software. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide digital human adaptation functionality of the type described above for one or more processes running on different ones of the containers. For example, a container host device supporting multiple containers of one or more container sets can implement one or more instances of digital human adaptation control logic and associated functionality for monitoring users interacting with a digital human.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a WAN, a LAN, a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an ASIC, an FPGA or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Figure 10:
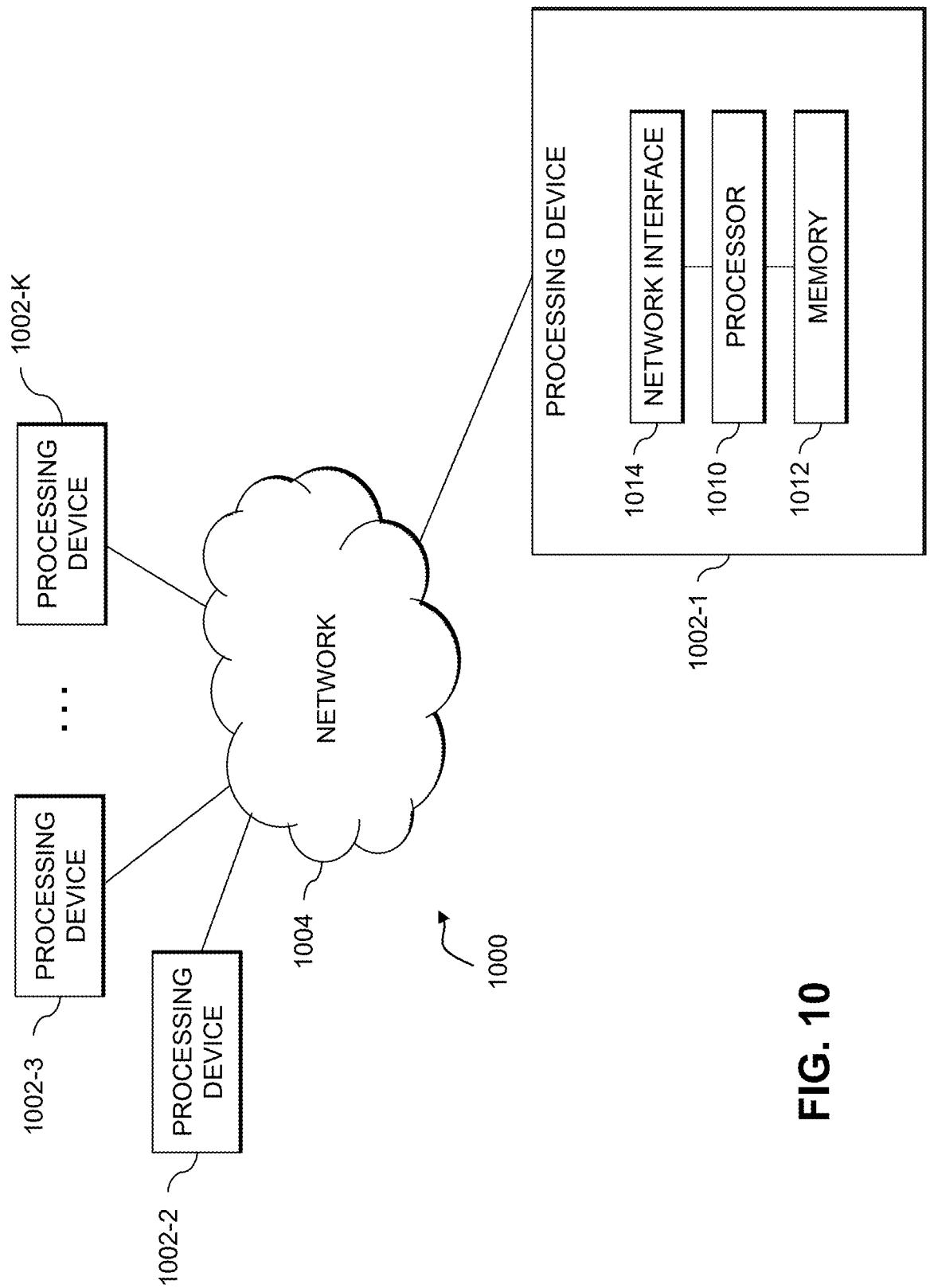
FIG. 10 illustrates another exemplary processing platform that may be used to implement at least a portion of one or more embodiments of the disclosure.

Multiple elements of an information processing system may be collectively implemented on a common processing platform of the type shown in FIG. 9 or 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining information characterizing a visual focus of at least one user interacting with one or more of at least one image and a virtual environment;
determining a predicted region of interest of the at least one user based at least in part on the visual focus of the at least one user, wherein the predicted region of interest of the at least one user has associated metadata indicating one or more items of interest to the at least one user, in the predicted region of interest of the one or more of the at least one image and the virtual environment, to the at least one user;
generating a query, using at least a portion of the metadata, in response to the determining the predicted region of interest, to obtain additional information from an information retrieval system related to at least one of the one or more items of interest in the predicted region of interest;
providing the query to the information retrieval system that generates one or more query results, wherein the query is based at least in part on the at least one of the one or more items of interest to the at least one user obtained from the metadata;
determining a prompt for a language model based at least in part on at least one of the one or more query results; and
providing a message, automatically generated by the language model based at least in part on the prompt, to the at least one user;
wherein the method is performed by at least one processing device comprising a processor coupled to a memory.

2. The method of claim 1, wherein the metadata indicating the one or more items of interest to the at least one user is one or more of provided by a given user and generated by extracting one or more characters from one or more images.

3. The method of claim 2, wherein the metadata indicating the one or more items of interest to the at least one user is associated with a corresponding portion, of a plurality of portions, of the one or more of the at least one image and the virtual environment.

4. The method of claim 1, further comprising tracking a movement of at least one eye of the at least one user and predicting the predicted region of interest of the at least one user based at least in part on the tracked movement of the at least one eye.

5. The method of claim 1, further comprising tracking a movement of at least one eye of the at least one user and generating one or more heatmaps to determine the predicted region of interest of the at least one user based at least in part on the tracking.

6. The method of claim 1, further comprising storing a context of a conversation with the at least one user and responding to one or more questions of the user using the stored context.

7. The method of claim 1, wherein the message is provided to the at least one user using at least one processor-based digital human.

8. An apparatus comprising:
at least one processing device comprising a processor coupled to a memory;
the at least one processing device being configured to implement the following steps:
obtaining information characterizing a visual focus of at least one user interacting with one or more of at least one image and a virtual environment;
determining a predicted region of interest of the at least one user based at least in part on the visual focus of the at least one user, wherein the predicted region of interest of the at least one user has associated metadata indicating one or more items of interest to the at least one user, in the predicted region of interest of the one or more of the at least one image and the virtual environment, to the at least one user;
generating a query, using at least a portion of the metadata, in response to the determining the predicted region of interest, to obtain additional information from an information retrieval system related to at least one of the one or more items of interest in the predicted region of interest;
providing the query to the information retrieval system that generates one or more query results, wherein the query is based at least in part on the at least one of the one or more items of interest to the at least one user obtained from the metadata;

determining a prompt for a language model based at least in part on at least one of the one or more query results; and providing a message, automatically generated by the language model based at least in part on the prompt, to the at least one user.

9. The apparatus of claim 8, wherein the metadata indicating the one or more items of interest to the at least one user is one or more of provided by a given user and generated by extracting one or more characters from one or more images.

10. The apparatus of claim 9, wherein the metadata indicating the one or more items of interest to the at least one user is associated with a corresponding portion, of a plurality of portions, of the one or more of the at least one image and the virtual environment.

11. The apparatus of claim 8, further comprising tracking a movement of at least one eye of the at least one user and predicting the predicted region of interest of the at least one user based at least in part on the tracked movement of the at least one eye.

12. The apparatus of claim 8, further comprising tracking a movement of at least one eye of the at least one user and generating one or more heatmaps to determine the predicted region of interest of the at least one user based at least in part on the tracking.

13. The apparatus of claim 8, further comprising storing a context of a conversation with the at least one user and responding to one or more questions of the user using the stored context.

14. The apparatus of claim 8, wherein the message is provided to the at least one user using at least one processor-based digital human.

15. A non-transitory processor-readable storage medium having stored therein program code of one or more software programs, wherein the program code when executed by at least one processing device causes the at least one processing device to perform the following steps:

obtaining information characterizing a visual focus of at least one user interacting with one or more of at least one image and a virtual environment;

determining a predicted region of interest of the at least one user based at least in part on the visual focus of the at least one user, wherein the predicted region of interest of the at least one user has associated metadata indicating one or more items of interest to the at least one user, in the predicted region of interest of the one or more of the at least one image and the virtual environment, to the at least one user;

generating a query, using at least a portion of the metadata, in response to the determining the predicted region of interest, to obtain additional information from an information retrieval system related to at least one of the one or more items of interest in the predicted region of interest;

providing the query to the information retrieval system that generates one or more query results, wherein the query is based at least in part on the at least one of the one or more items of interest to the at least one user obtained from the metadata;

determining a prompt for a language model based at least in part on at least one of the one or more query results; and providing a message, automatically generated by the language model based at least in part on the prompt, to the at least one user.

16. The non-transitory processor-readable storage medium of claim 15, wherein the metadata indicating the one or more items of interest to the at least one user is one or more of provided by a given user and generated by extracting one or more characters from one or more images, and wherein the metadata indicating the one or more items of interest to the at least one user is associated with a corresponding portion, of a plurality of portions, of the one or more of the at least one image and the virtual environment.

17. The non-transitory processor-readable storage medium of claim 15, further comprising tracking a movement of at least one eye of the at least one user and predicting the predicted region of interest of the at least one user based at least in part on the tracked movement of the at least one eye.

18. The non-transitory processor-readable storage medium of claim 15, further comprising tracking a movement of at least one eye of the at least one user and generating one or more heatmaps to determine the predicted region of interest of the at least one user based at least in part on the tracking.

19. The non-transitory processor-readable storage medium of claim 15, further comprising storing a context of a conversation with the at least one user and responding to one or more questions of the user using the stored context.

20. The non-transitory processor-readable storage medium of claim 15, wherein the message is provided to the at least one user using at least one processor-based digital human.

* * * * *